United States Patent [19]

Joyce et al.

[11] 4,308,589
[45] Dec. 29, 1981

[54] APPARATUS FOR PERFORMING THE SCIENTIFIC ADD INSTRUCTION

[75] Inventors: Thomas F. Joyce, Burlington; Richard A. LeMay, Carlisle; William E. Woods, Natick; Richard P. Brown, Acton, all of Mass.

[73] Assignee: Honeywell Information Systems Inc., Waltham, Mass.

[21] Appl. No.: 93,096

[22] Filed: Nov. 8, 1979

[51] Int. Cl.³ .............................................. G06F 7/50
[52] U.S. Cl. .................................................. 364/748
[58] Field of Search ...................... 364/748, 784, 786

[56] References Cited

U.S. PATENT DOCUMENTS

| | | | |
|---|---|---|---|
| 3,193,669 | 7/1965 | Voltin | 364/748 |
| 3,814,925 | 6/1974 | Spannagel | 364/748 X |
| 4,075,704 | 2/1978 | O'Leary | 364/748 |
| 4,161,784 | 7/1979 | Cushing et al. | 364/748 |

*Primary Examiner*—Jerry Smith
*Attorney, Agent, or Firm*—George Grayson; Nicholas Prasinos

[57] ABSTRACT

The performance of a scientific ADD instruction is improved by storing the mantissas of both operands in each of two random access memories, selecting the mantissa with the smaller exponent, shifting that mantissa and performing the ADD operation of adding the mantissas in one machine cycle.

14 Claims, 4 Drawing Figures

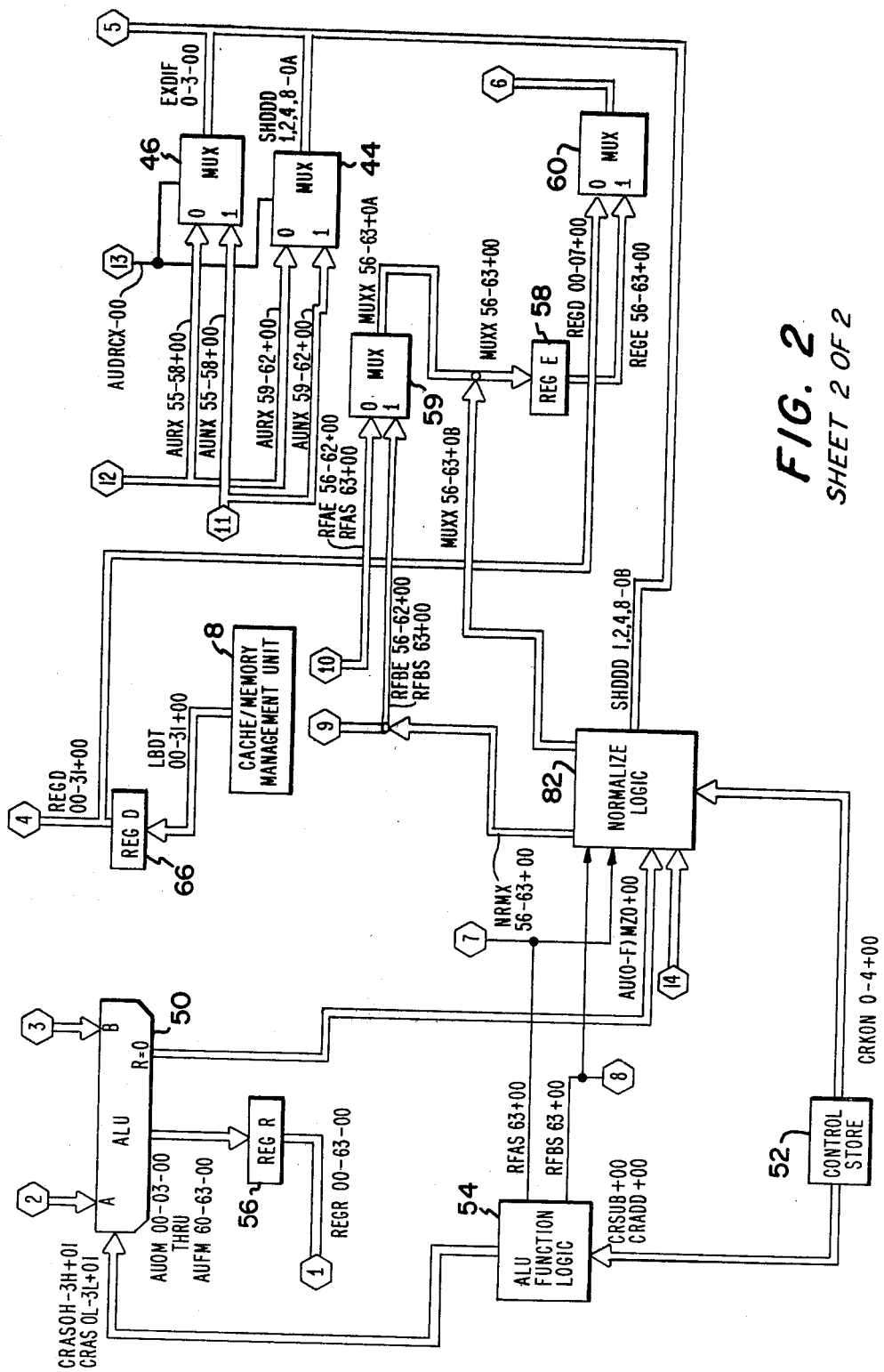
FIG. 2 SHEET 2 OF 2

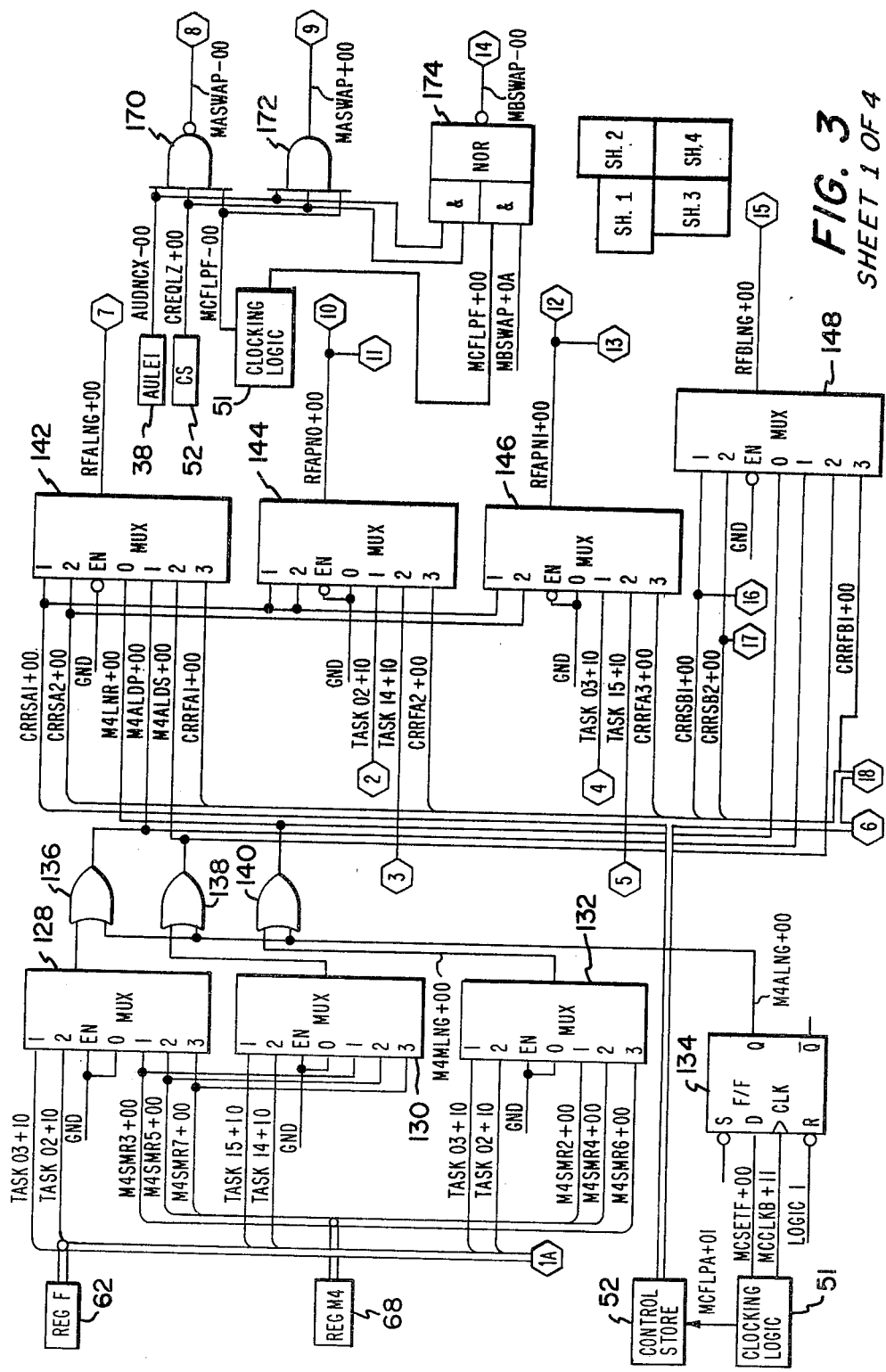
FIG. 3 SHEET 1 OF 4

APPARATUS FOR PERFORMING THE SCIENTIFIC ADD INSTRUCTION

RELATED APPLICATIONS

1. "Automatic Rounding of Floating Point Operands", invented by Thomas F. Joyce, Ser. No. 092,907, filed on Nov. 9, 1979 and assigned to the same assignee as named herein.

2. "Automatic Operand Length Control of the Results of a Scientific Arithmetic Operation", invented by Thomas F. Joyce, Richard A. Lemay and William E. Woods, Ser. No. 092,619, filed on Nov. 8, 1979 and assigned to the same assignee as named herein.

3. "A Hexadecimal Digit Shifter Output Control by a Programmable Read Only Memory", invented by Thomas F. Joyce and David E. Cushing, Ser. No. 092,810, filed on Nov. 9, 1979 and assigned to the same assignee as named herein.

BACKGROUND OF THE INVENTION

1. Field of Use

The invention relates generally to data processing systems and more specifically to the processing of the scientific ADD instruction in a scientific instruction processor.

2. Description of the Prior Art

Floating point operands include a mantissa, a mantissa sign and an exponent. A scientific processor processes a scientific ADD instruction by comparing the exponents of the operands to determine if they are equal in a first cycle, and shifting the mantissa with the smaller exponent a number of digit positions corresponding to the difference in exponents in a second machine cycle. Such a system is described in U.S. Pat. No. 3,551,665 entitled "Floating Point Binary Adder Utilizing Completely Sequential Hardware."

The Honeywell H800 computing system performed the scientific ADD instruction by testing if the exponents were equal in a first cycle; and if equal, shifting the mantissa one position in a second cycle, then testing the exponents for equal in a third cycle; and if unequal, shifting the mantissa in a fourth cycle. This sequence was repeated until the exponents were equal.

U.S. Pat. No. 4,130,879 entitled "Apparatus for Performing Floating Point Arithmetic Operations Using Submultiple Storage" discloses apparatus for performing a scientific multiply. This same apparatus, when performing the scientific ADD instruction, compares the exponents in a first cycle, shifts the mantissa in a second cycle, and performs the ADD function in a third cycle.

These prior systems have the disadvantage of requiring a relatively large number of cycles for aligning the mantissas when performing the scientific ADD instruction.

It should be understood that the references cited herein are those of which the applicants are aware, and are presented to acquaint the reader with the level of skill in the art, and may not be the closest reference to the invention. No representation is made that any search has been conducted by the applicants.

OBJECTS OF THE INVENTION

Accordingly, it is a primary object of the invention to provide a scientific instruction processor with improved apparatus for performing the scientific ADD instruction.

It is another object of the invention to provide an improved scientific instruction processor which performs the exponent comparison, the mantissa shift, and the ADD operation in one machine cycle.

BRIEF DESCRIPTION OF THE DRAWINGS

The novel features which are characteristic of the invention are set forth with particularity in the appended claims. The invention itself, however, both as to organization and operation, may best be understood by reference to the following description in conjunction with the drawings in which:

SUMMARY OF THE INVENTION

Scientific instructions are executed jointly by the central processor (CP) and the scientific instruction processor (SIP). Instructions are stored in the memory modules and are first detected by the CP when it fetches the first word of the instruction from memory. If the first word of the instruction identifies it as a scientific instruction, the CP transfers the instruction and operand to the SIP.

For the scientific ADD instruction, the normalized first operand is added to a normalized second operand stored in an accumulator in the SIP, and the answer is stored in the accumulator.

The operand processed by the scientific ADD instruction is in the form of a floating point number including a mantissa, an exponent, and a sign.

The SIP includes four random access memories, two for storing mantissas and two for storing exponents and signs. Each random access memory includes at least two accumulator positions, one storing the first operand and the other storing the second operand.

A first random access memory (RAM) is coupled to a first arithmetic logic unit (ALU). A second random access memory (RAM) is coupled to a digit shifter which in turn is coupled to the first ALU. The first and second RAMs each store the mantissas of the first and second operands.

A third and fourth RAM are each coupled to a second and third ALU. The third and fourth RAMs each store the signs and exponents of the first and second operands.

An output of the second ALU identifies the smaller exponent of the first and second operands, and conditions address selection logic to select the mantissa of the operand having the smaller exponent to be read from the second RAM through the digit shifter to the first ALU. At the same time, the mantissa of the operand having the larger exponent is read from the first RAM to the first ALU. The amount by which the exponents differ is applied to the digit shifter to align the mantissa of the operand having the smaller exponent for the ADD function.

DESCRIPTION OF THE PREFERRED EMBODIMENT

Figure 1:
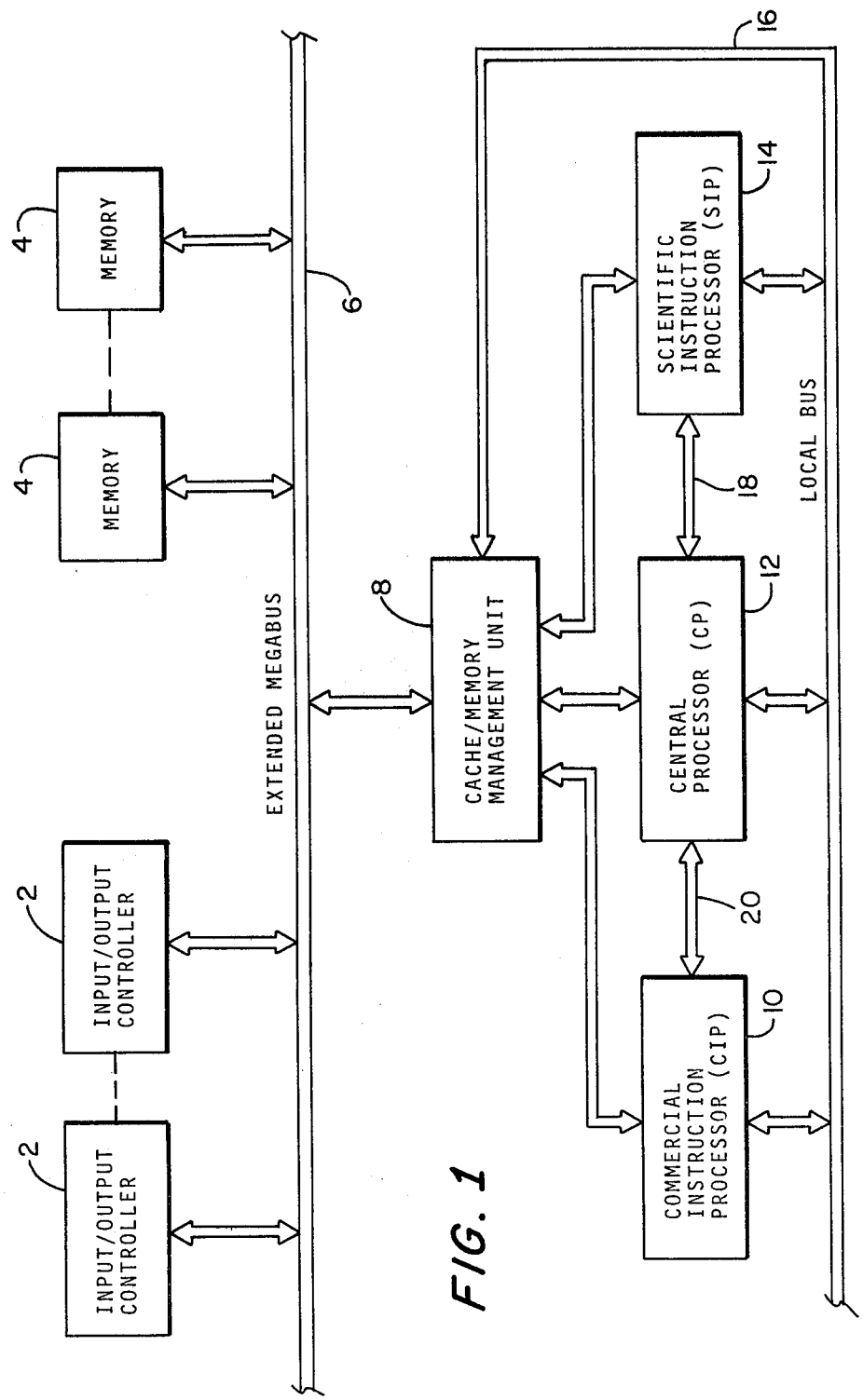
FIG. 1 is the overall block diagram of the system.

FIG. 1 shows a block diagram of the overall system in which the present invention may be incorporated which includes a plurality of input/output controllers 2 and a plurality of memory modules 4 coupled in common to an extended bus 6. Also coupled to bus 6 is a cache/memory management unit 8.

The system further includes a central processor (CP) 12, a commercial instruction processor (CIP) 10, and a scientific instruction processor (SIP) 14 coupled in common to a local bus 16 and also coupled to the cache/memory management unit 8, which is also coupled to bus 16. The SIP 14 and CP 12 are coupled by a CP-SIP bus 18. CP 12 and the CIP 10 are also coupled by a CP-CIP bus 20.

The functions of the input/output controllers 2 and memory 4 are well known in the art and will be described only as they relate to the invention. The CP 12 receives information in the form of computer instructions from cache/memory management unit 8. The SIP 14 executes scientific instructions received by CP 12, which include floating point instructions. The CIP 10 executes instructions received by the CP 12 to facilitate the processing of character strings and decimal data.

The invention improves the performance of the scientific ADD instruction by, in one pass, selecting the mantissa to be shifted from random access memory, shifting the mantissa, performing the addition and storing the result back in random access memory. It is understood, however, by those skilled in the art that further processing of the result may be required such as normalizing, rounding, processing a mantissa overflow, or complementing.

A floating point operand can be 32 bits or 64 bits in length including a 7 bit exponent, a 1 bit matissa sign, and either a 24 or 56 bit mantissa. The exponent is in excess 64 form with the range of value from −64 to +63. The mantissa is negative when the sign bit is at logical ONE and positive when the sign bit is at logical ZERO. The mantissa is a fractional number with the hexadecimal point to the left of the high order bit of the mantissa.

The scientific ADD instruction adds the contents of the effective address (EA) in memory 4 to the contents of a scientific accumulator in SIP 14, and the result is stored in the accumulator. For the purposes of discussion, operand # is stored in scientific accumulator # (SA#) and operand N is stored in the EA.

The scientific ADD therefore performs the operation of (SA#)←(SA#)+(EA) where () indicates "the contents of".

Figure 2:
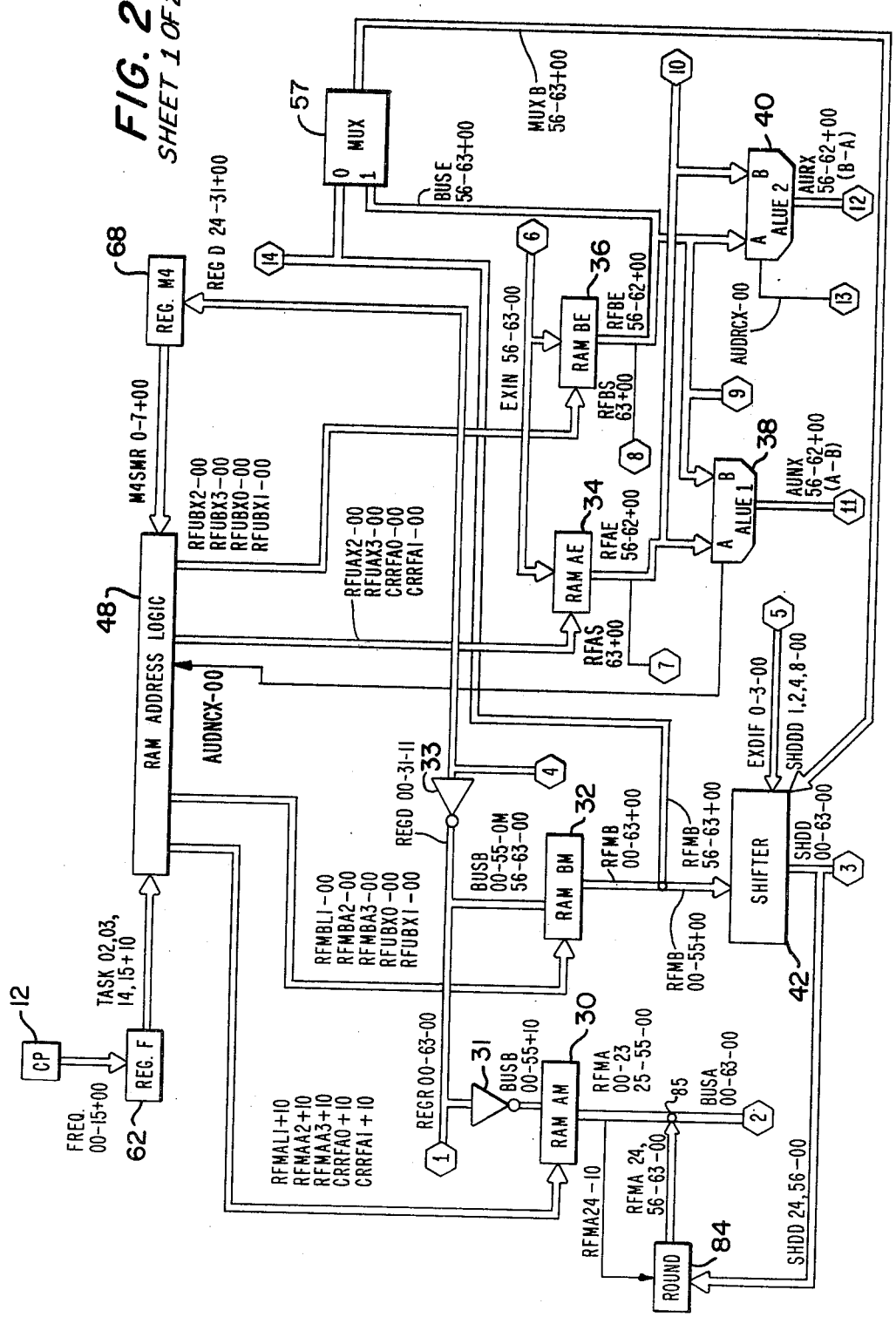
FIG. 2 is an overall block diagram of the scientific instruction processor.

FIG. 2 shows an overall block diagram of the SIP 14. RAMAM 30 is a 56 bit by 16 address location random access memory (RAM) and stores the mantissa of operand # and operand N. It comprises 14 74S189 circuits. Three address locations are set aside as scientific accumulators. One of the scientific accumulators is assigned by the SIP 14 logic as SA# and a second scientific accumulator which stores the (EA) is assigned as SAN.

RAMBM 32 is a 64 bit by 16 address location random access memory and stores the mantissa of operand # in SA# and the mantissa of operand N in SAN. It comprises 16 74S189 circuits. RAMAE 34 and RAMBE 36 are 8 bit by 16 address location random access memories and store the exponent and mantissa signs of operand # and operand N in both RAMAE 34 and RAMBE 36. Each RAM, RAMAE 34 and RAMBE 36, comprises two 74S189 circuits. The 74S189 circuits are described in "The TTL Databook for Design Engineers", Second Edition, published by Texas Instruments. For the scientific ADD instruction, the exponent and mantissa signs of operand # are selected as the output signals of RAMAE 34, and the exponent and mantissa sign of operand N are selected as the output signals of RAMBE 36.

Both the RAMAE 34 and the RAMBE 36 output signals are coupled to arithmetic logic units ALUE1 38 and ALUE2 40. ALUE1 38 and ALUE2 40 are each made up of two 74S181 circuits. The exponent of SA# is read from RAMAE 34 and is applied to the A input terminal of ALUE1 38 and the B input terminal of ALUE2 40 as output signals RFAE56−62+00. Similarly, the exponent of SAN is read from RAMBE 36 and is applied to the A input terminals of ALUE2 40 and the B input terminals of ALUE1 38 as output signals RFBE56−62+00.

ALUE1 38, by means of an AUDNCX−00 signal applied to RAM address logic 48, indicates the operand with the smaller exponent and selects that mantissa to be read from RAMBM 32 and applied to shifter 42. The output signals AUNX56−62+00 and AURX56−62+00 of ALUE1 38 and ALUE2 40 respectively also indicate the magnitude of the difference, which is applied to the shifter 42 to shift the mantissa of the operand with the smaller exponent to the right the number of places required to align the two mantissas for the scientific ADD operation.

MUX's 44 and 46 select the two hexadecimal digits which represent the absolute difference between the exponents in SA# and SAN. ALUE1 38 indicates the difference of the SA# exponent minus the SAN exponent, and ALUE2 40 indicates the difference of the SAN exponent minus the SA# exponent.

A logic signal AUDRCX−00, an output signal of ALUE2 40, is applied to the select terminals of MUX's 44 and 46, and when at logical ZERO, indicates that the operand N exponent is larger than or equal to the operand # exponent. The AURX 55-62 output signals are selected through MUX's 44 and 46 and are applied to shifter 42 by means of output signals SHDDD 1,2,4,8-00 and EXDIF 0-3-00, which indicate the magnitude of the number of hexadecimal digits to be right shifted. The logic signal AUDRCX−00 at logical ONE indicates that the operand # exponent is larger than or equal to the operand N exponent. The AUNX 55-62 output signals are selected through MUX's 44 and 46 for transfer to the shifter 42.

If the SA# mantissa is selected from RAMAM 30, then the SAN mantissa is selected from RAMBM 32 and vice versa. RAM address logic 48 address select signals RFMBL1-00, RFMBA2−00, RFMBA3−00, RFUBX0−00 and RFUBX1−00 select the mantissas of SAN or SA# of RAMBM 32. Address select signals RFMAL1+10, RFMAA2+10, RFMAA3+10, CRRFA0+10 and CRRFA1+10 select the mantissas of SA# or SAN of RAMAM 30.

The output signals RFMB00−55+00 of RAMBM 32 and eight trailing zeroes, which output a MUX 57, are applied to shifter 42 and shifted the number of positions to the right specified by signals EXDIF0−3−00 and SHDDD1,2,4,8−00. The shifter 42 output signals SHDD00−63−00 are applied to the B input terminals of an ALU 50. The output signals RFMA00−23, 25−55−00 and RFMA24,56−63−00 are applied to a junction 85. Signals BUSA00−63−00 are applied to the A terminal of ALU 50 from junction 85. ALU 50 comprises 16 74S181 circuits. The result signals AU0M00−03−00 through AUFM60−63−00 are stored in a register REGR 56. The output signals REGR00−63−00 are applied to the input of RAMAM 30 and RAMBM 32 to be written into the address location defined as SA#. The larger exponent and its mantissa sign are written into SA# of RAMAE 34 and RAMBE 36 through a multiplexer (MUX) 59, a register REGE 58, and a MUX 60 under firmware control.

A normalization cycle is required if the high order hexadecimal digit is a hexadecimal ZERO. Signals AU(0−F)MZ0+00 applied to normalize logic 82 from the ALU 50 indicate which of the 16 hexadecimal digits are at hexadecimal ZERO. Normalize logic 82 generates shift signals SHDDD 1,2,4,8−0B, which are applied to the shifter 42. Shifter 42 shifts the operand result read from SA# of RAMBM 32 to place the most significant hexadecimal digit in the high order position of the operand. Signals NRMX56−63+00 are applied to the B input terminal of ALUE1 38 to indicate the number of leading hexadecimal ZEROs in the operand to be normalized. Signals NRMX56−63+00 are subtracted from signals RFAE56−62+00 in ALUE1 38.

Signals AUNX56−62+00, the output of ALUE1 38, as well as mantissa sign signal RFAS63+00, are selected to generate the MUXX56−63+OB exponent signals during the normalization cycle. Signals MUXX56−63+OB indicate the exponent value and mantissa sign of the normalized result and are stored in REGE 58.

The scientific accumulators SA1, SA2, and SA3 are assigned to address locations 5, 6 and 7 respectively of RAMAM 30, RAMBM 32, RAMAE 34, and RAMBE 36.

An output register REGF 62, loaded from CP 12 by signals FREQ00−15+00, stored signals TASK02+10 and TASK03+10, which define the address location of SA#, and signals TASK14+10 and TASK15+10, which define the address location of SAN of address locations 5, 6 and 7. One of the scientific accumulators SA1, SA2, or SA3 is designated as SA# and one of the scientific accumulators is designated as SAN. A register REGM4 68 stores indications of the word length of the accumulators and the operands transferred from memory (two words of 32 bits or four words of 64 bits). REGM4 68 is loaded from REGD 66 through signals REGD24−31 +00.

Signals RFMA24−10 and SHDD24,56−10 are applied to round 84, which applies signals RFMA24,56−63−00 to junction 85. The rounding operation is described in copending related U.S. application Ser. No. 092,907 entitled "Automatic Rounding of Floating Point Operands".

Inverter 31 provides proper polarity of the BUSB00−55+10 input signal to RAMAM 30. Inverter 33 isolates the REGR 56 and REGD 66 output signals.

ALU function logic 54 controls the ALU 50 operation. The firmware signals CRSUB+00 and CRADD+00 as well as the mantissa sign signals RFAS63+00 and RFBS63+00 indicate functions the ALU 50 is to perform by means of output signals CRAS OH−3H+01 and CRAS OL−3L+01.

Figure 3:
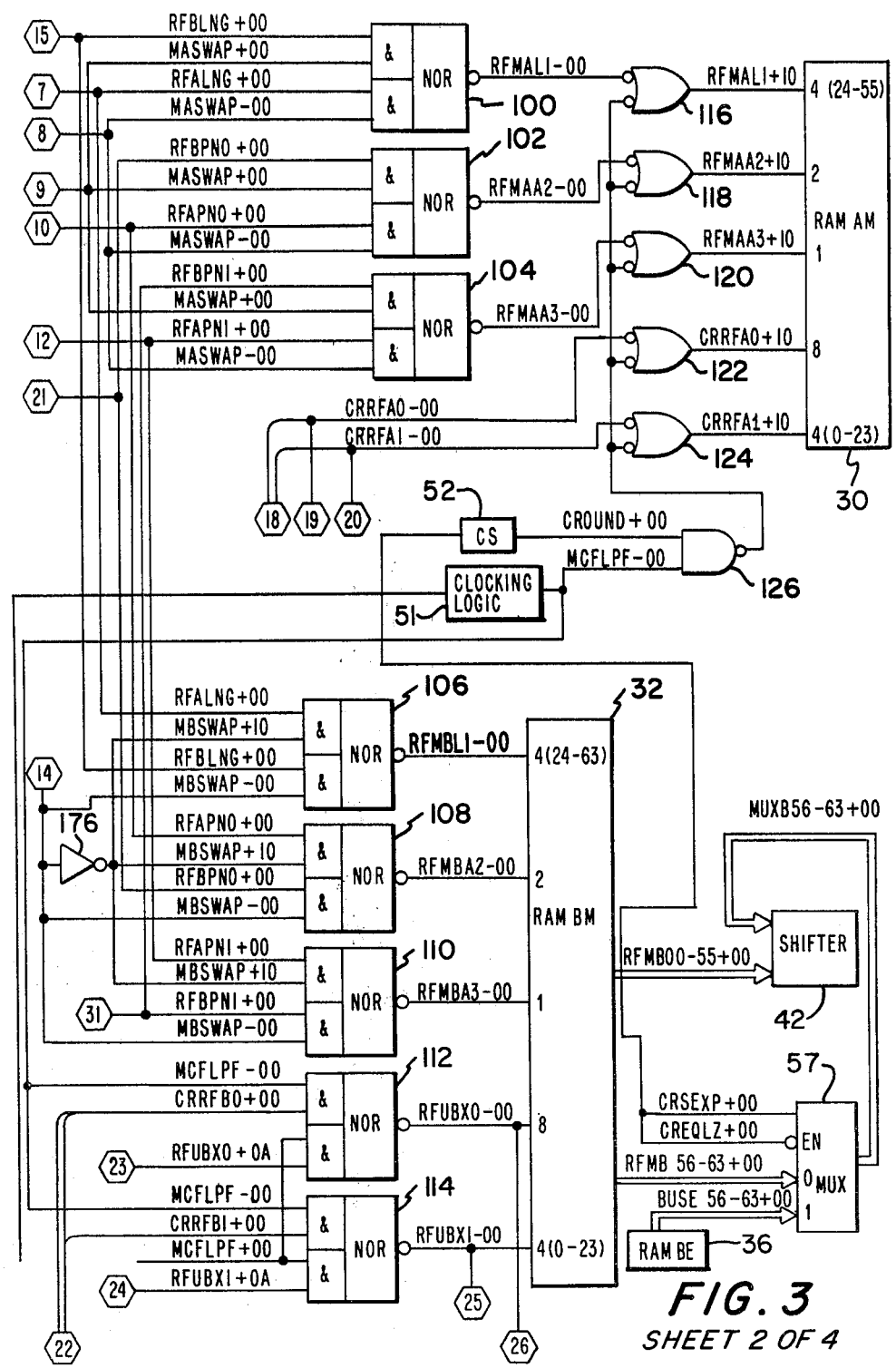
FIG. 3 is a detailed diagram of the addressing logic.
Figure 3:
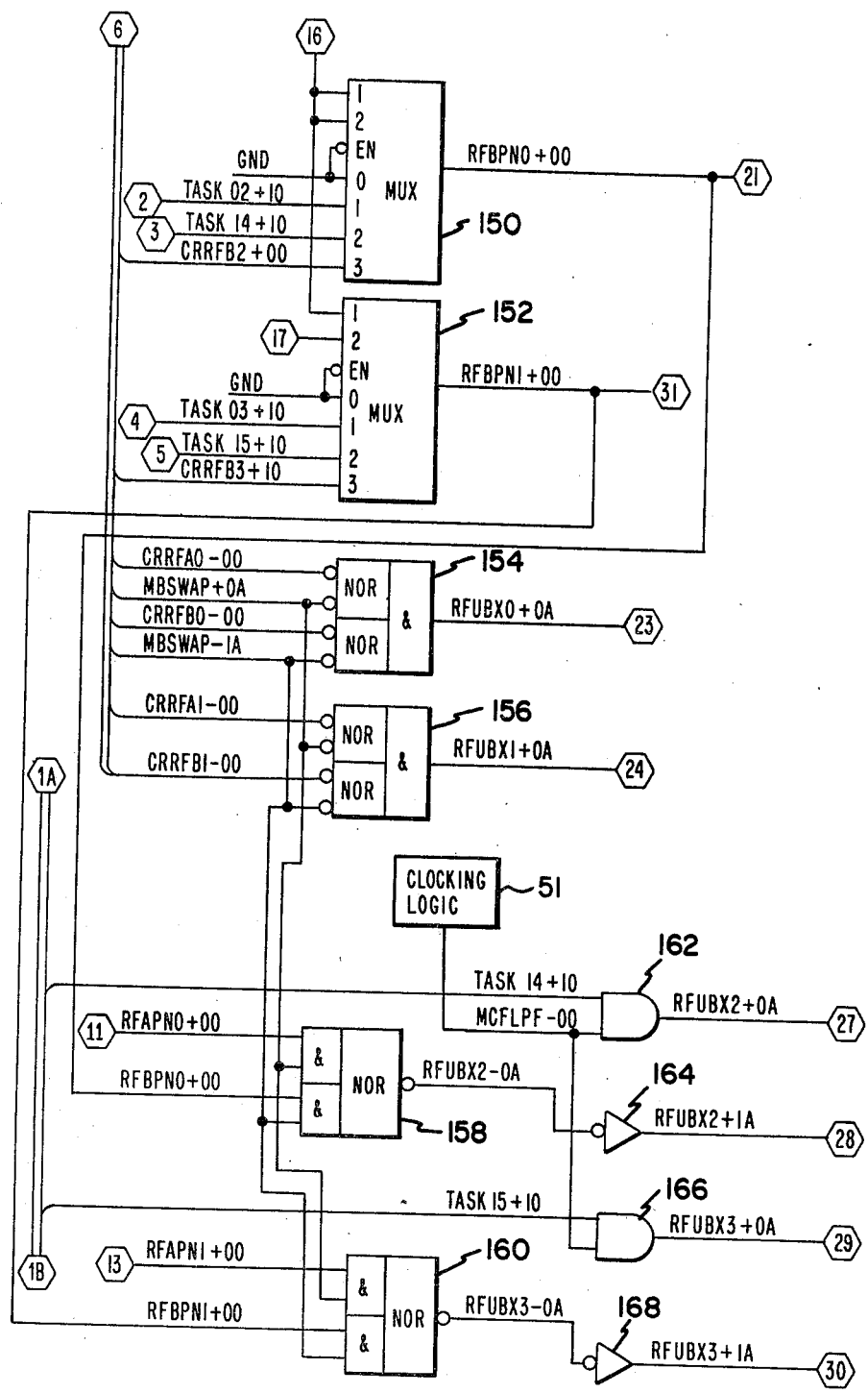
Figure 3:
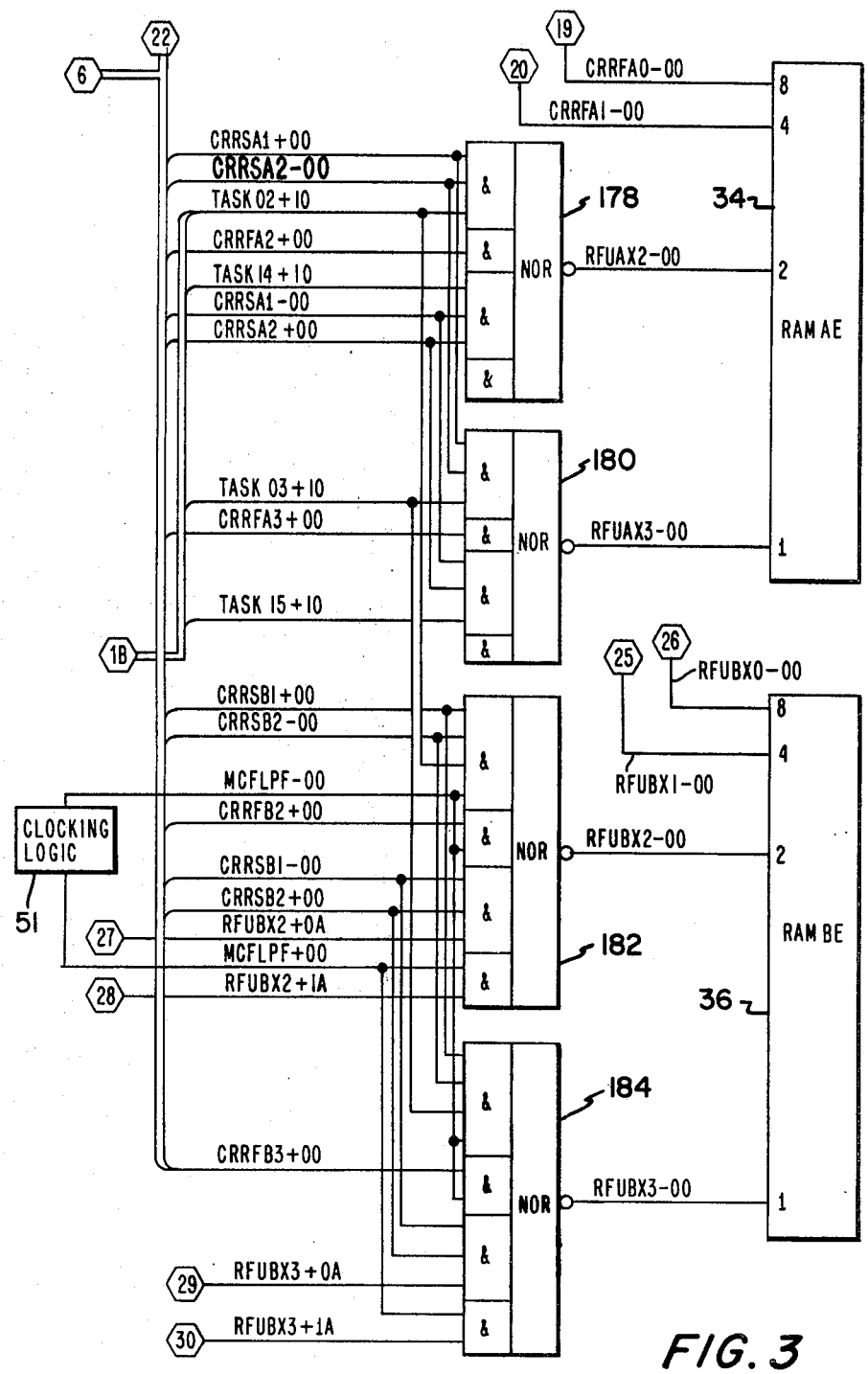

Referring to FIG. 3, output signals TASK02+10 and TASK03+10 of register REGF 62 identify the address location of SA# and output signals TASK14+10 and TASK15+10 identify the address location of SAN or RAMAM 30, RAMAM 32, RAMAE 34, and RAMBE 36.

Output signals M4SMR3+00, M4SMR5+00 and M4SMR7+00 indicate the length of the operand stored in SA1, SA2, and SA3 respectively. A MUX 128 provides an output signal at logical ONE to indicate a four word operand for SA#. Similarly, a MUX 130 indicates the operand length for SAN.

Output signals M4SMR2+00, M4SMR4+00, and M4SMR6+00 at logical ONE indicate that the length of the memory 4 data field associated with SA1, SA2 and SA3 respectively is four words, and when at logical ZERO, two words. These signals are applied to a MUX 132 which indicates the memory 4 data field length. The output of MUX's 128, 130 and 132 are applied to inputs of OR gates 136, 138 and 140 respectively. Memory operations are not a part of the invention and are not further described.

Multiplexers 142, 144 and 146 generate output signals RFALNG+00, RFAPN+00 and RFAPN1+00 under control of firmware signals CRRSA1+00 and CRRSA2+00 from control store 52. Signal RFALNG+00 at logical ONE indicates a four word operand in memory 4. Signal M4LNR+00, at logical ONE, applied to the input terminal 0 of MUX 142 indicates that the memory 4 word associated with SA# is a four word operand. Signal M4ALDP+00, at logical ONE, applied to input terminal 1 of MUX 142 indicates that SA# is a four word operand. The signal M4ALDS+00, at logical ONE, applied to input terminal 2 of MUX 142 indicates that SAN is a four word operand. The signal CRRFA1+00 applied to input terminal 3 permits firmware control of the length address signal RFALNG+00. MUX 148 controls length address signal RFBLNG+00 in a manner similar to the control of signal RFALNG+00 by MUX 142.

Output signals RFAPN0+00 and RFAPN1+00 indicate, under firmware control, the SA# address location when input terminals 1 of MUX's 144 and 146 are selected, and the SAN address location when input terminals 2 are selected. Input terminals 3 are controlled by firmware signals CRRFA2+00 and CRRFA3+00 respectively. Firmware signals are generated at MCFLPA+01 time in control store 52.

Output signals RFBLNG+00, RFBPN0+00, and RFBPN1+00 and MUX's 148, 150 and 152 are controlled in a similar manner to output signals RFALNG+00, RFAPN0+00, and RFAPN1+00.

A flop 134 is operative during the cycle in which the result is read out by REGR 56, FIG. 2, to SA# in RAMAM 30 and RAMBM 32, and forces a four word write. Output signal M4ALNG+00 is applied to the inputs of OR gates 136, 138 and 140.

Signals RFALNG+00 and RFBLNG+00 are applied to the inputs of AND/NOR gates 100 and 106. Signals RFAPN0+00 and RFBPN0+00 are applied to the inputs of AND/NOR gates 102 and 108. Signals RFAPN1+00 and RFBPN1+00 are applied to the inputs of AND/NOR gates 104 and 110.

The mantissa of the operand having the smaller exponent is read from RAMBM 32 to shifter 42, FIG. 2. The exponent of SA# is read from RAMAE 34, FIG. 2, into the A input terminal of ALUE1 38, and the exponent of SAN is read from RAMBE 34 into the B input terminal of ALUE1 38. The output signal AUDNCX−00 from ALUE1 38 at logical ONE indicates that the exponent of SA# is smaller than the exponent of SAN. In that case, the mantissa of SA# is read from RAMBM 32 and the mantissa of SAN is read from RAMAM 30. If the exponent of SAN were smaller than the exponent of SA#, then the mantissa of SAN would be read from RAMBM 32 and the mantissa of SA# would be read from RAMAM 30.

Referring to FIG. 3, signal AUDNCX−00 is applied to the input of a NAND gate 170, an AND gate 172 and an AND/NOR gate 174. Firmware signal CREQLZ+00 is at logical ONE for this equalization operation. Signal MCFLPF−00 is at logical ONE since this is not a transfer from a REGR 56, FIG. 2, operation. Therefore, signal MASWAP+00, the output of AND gate 172, is at logical ONE and signal MASWAP−00, the output of NAND gate 170, is at logical ZERO. Also, the output of AND/NOR gate 174, signal MBSWAP−00, is at logical ONE and signal MBSWAP+10, the output of an inverter 176, is at logical ZERO. Therefore, the address signals RFBLNG+00, RFBPN0+00 and RFBPN1+00, which normally control the address selection of RAMBM 32, control the address selection of RAMAM 30 and address signals RFALNG+00, RFAPN0+00, and RFAPN1+00, which normally control the address selection of RAMAM 30, control the address selection of RAMBM 32.

The inputs to AND/NOR gates 154 and 156, signals CRRFA0−00, CRRFA1−00, CRRFB0−00 and CRRFB1−00, are operative under firmware control to generate output signals RFUBX0+0A and RFBUX1+0A, which are applied to the inputs of AND/NOR gates 112 and 114 respectively. Logic signal MCFLPF+00 is at logical ONE during the register REGR 56 transfer of data to RAMAM 30 and RAMBM 32. Timing signals MCCLKB+11, MCSETF+00, MCFLPF+00 and MCFLPF−00 are generated as clocking logic 51.

Firmware signals CRRFB0+00 and CRRFB1+00 are applied to the AND/NOR gates 112 and 114 respectively. Signal MCFLPF−00 is at logical ONE during the readout of the mantissas, thereby generating the RFUBX0−00 output signal of AND/NOR gate 112, which is applied to input terminal 8 of RAMBM 32, and the RFUBX1−00 output signal of AND/NOR gate 114, which is applied to input terminal 4 of RAMBM 32, bit positions 0-23.

During the equalization operation, that is, when the mantissa swap may take place, the address signals CRRFA0+10 and CRRFA1+10 applied to RAMAM 30 are controlled by the firmware as are the address signals RFUBX0−00 and RFUBX1−00 applied to RAMBM 32.

Output signals RFMAL1−00, RFMAA2−00 and RFMAA3−00 of AND/NOR gates 100, 102 and 104 respectively are applied to the inputs of NOR gates 116, 118 and 120. The output signal RFMAL1+10 of NOR gate 116 is applied to input terminal 4 of RAMAM 30, storing mantissa bits 24 through 55, that is, the long operand words. Output signals RFMAA2+10 and RFMAA3+10 are applied to input terminals 2 and 1 respectively of RAMAM 30. Firmware signals CRRFA0−00 and CRRFA1−00 are applied to the inputs of NOR gates 122 and 124 respectively. The output signal CRRFA0+10 is applied to input terminal 8 of RAMAM 30 and the output signal CRRFA1+10 is applied to input terminal 4 of RAMAM 30, bit positions 0 through 23. NAND gate 126 is operative during the rounding operation of select address location 15 of RAMAM 30 by means of control signal CROUND+00 and timing signal MCFLPF−00 for forcing ZEROs in that location.

Output signals RFMBL1−00, RFMBA2−00 and RFMBA3−00 of AND/NOR gates 106, 108 and 110 respectively are operative with RAMBM 32 and output signals RFMAL1+10, RFMAA2+10 and RFMAA3+10 of AND/NOR gates 100, 102 and 104 respectively are operative with RAMAM 30 through NOR gates 116, 118 and 120.

An AND/NOR gate 178 generates an output signal RFUAX2-00 which is applied to input terminal 2 of RAMAE 34 and an AND/NOR gate 180 generates an output signal RFUAX3−00 which is applied to input terminal 1 of RAMAE 34. For the scientific ADD instruction, the TASK02+10 and the TASK03+10 signals and the firmware signals CRRSA1+00 and CRRSA2−00, applied to the inputs of AND/NOR gates 178 and 180, select the SA# address location of the exponent stored in RAMAE 34. Firmware signals CRRFA2+00 and CRRFA3+00 also control the selection of the exponent stored in RAMAE 34.

An AND/NOR gate 182 generates an output signal RFUBX2−00 which is applied to input terminal 2 of RAMBE 36 and an AND/NOR gate 184 generates an output signal RFUBX3−00 which is applied to input terminal 1 of RAMBE 36. Signals RFUBX1−00 and RFUBX0−00 are applied to input terminals 4 and 8 respectively of RAMBE 36.

During the readout of RAMBE 36, the TASK14+10 and TASK15+10 signals are applied to the inputs of AND gates 162 and 166, thereby generating output signals RFUBX2+0A and RFUBX3+0A when timing signal MCFLPF−00 is at logical ONE, thereby selecting the address location of SAN. During the write result operation, AND/NOR gates 158 and 160 generate output signals RFUBX2−0A and RFUBX3−0A which are inverted through inverters 164 and 168 to develop the SA# address location in RAMBE 36 in conjunction with signals RFUBX0−00 and RFUBX1−00.

MUX 57 is enabled by the CREQLZ+00 signal at logical ZERO. During the mantissa equalization operation, MUX 57 is disabled thereby forcing signals MUXB56−63+00 to logical ZERO. MUX 57 is enabled to transfer the exponent to the shifter 42 from RAMBM 32 or RAMBE 36 by control signal CRSEXP+00.

In summary, referring to FIG. 2, the exponent in address location SA# is read out of RAMAE 34 and the exponent in address location SAN is read out of RAMBE 36 and compared in ALUE1 38. The mantissa having the smaller exponent is read out of the address location in RAMBM 32 into shifter 42. The mantissa having the larger exponent is read out of RAMAM 30 into ALU50.

The difference between the SA# exponent stored in the RAMAE 34 and the SAN exponent stored in RAMBE 36 is applied to the shifter 42 and indicates the number of hexadecimal digits the smaller mantissa is shifted to the right. The shifted mantissa is applied to the ALU50 and the result is stored in REGR 56 from which it is transferred in SA# address location of RAMAM 30 and RAMBM 32.

The larger exponent with its mantissa sign is stored in the SA# address location of RAMAE 34 and RAMBE 36. This is selected by MUX 59 by the AUDNCX−00 signal and stored in REGE 58 for transfer to RAMAE 34 and RAMBE 36.

If the exponents in address locations SA# and SAN of RAMAE 34 and RAMBE 36 are equal, then the output signal AUDNCX−00 is at logical ZERO. The mantissa in address location SA# is read out of RAMAM 30 and the mantissa in address location SAN is read out of RAMBM 32.

If the mantissa signs are alike, the mantissas are added in ALU50, FIG. 2. If the mantissa signs are not alike, the B mantissa input to ALU50 is subtracted from the A mantissa input. The arithmetic operation is controlled by function control 54 by means of signals CRAS0H−3H+01 and CRAS0L−3L+01.

If the result in REGR 56 is in the complement form, then another pass through the ALU50 is required for recomplementing the mantissa and correcting the sign. This operation is not shown since it is not necessary to describe the invention.

Figure 4:
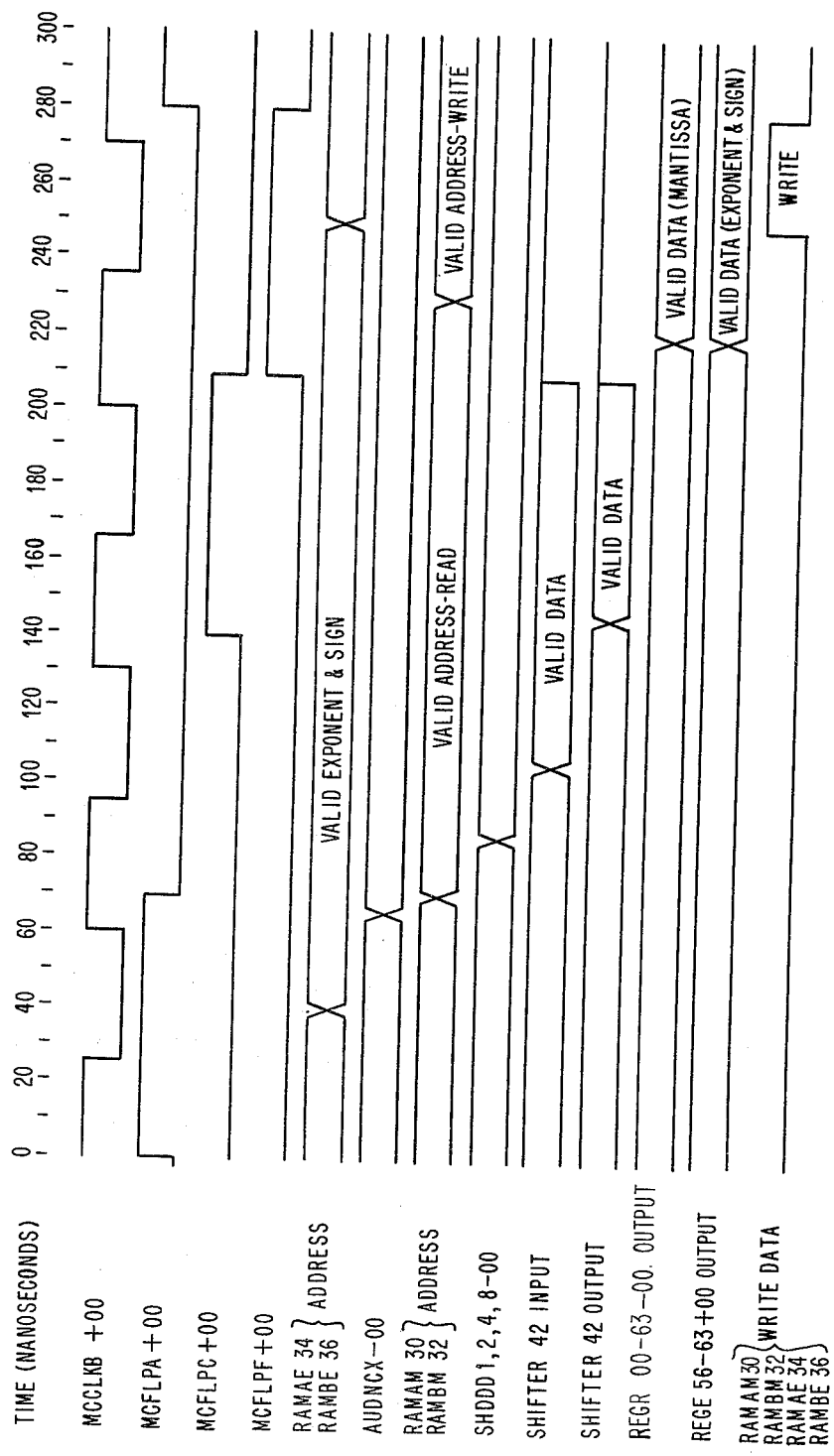
FIG. 4 is a timing diagram of the scientific ADD operation.

Referring to FIG. 4, clock signal MCCLKB+00 is at logical ONE for 35 nanoseconds and at logical ZERO for 35 nanoseconds. Clock signal MCCLKB+00 generates the clock signals MCFLPA+00, MCFLPC+00 and MCFLPE+00. The clock signals are generated by clocking logic 517 FIG. 3.

The exponent and mantissa sign are available at the output of RAMAE 34 and RAMBE 36 approximately 40 nanoseconds after the rise of the MCFLPA+00 clock signal. These signals are applied to the input of ALUE1 38 and ALUE2 40 and the output signal of ALUE1 38, AUDNCX−00, is available approximately 65 nanoseconds after the rise of the MCFLPA+00 clock signal. The address location selection signals of RAMAM 30 and RAMBM 32 are available approximately 70 nanoseconds after the rise of the MCFLPA+00 clock signal and the data is available at the input of shifter 42, approximately 105 nanoseconds after the rise of the MCFLPA+00 clock signal. The signals indicating the number of hexadecimal digits as the mantissa with the smaller exponent, SHDDD 1,2,4,8-00 are available at the shifter 42, approximately 85 nanoseconds after the rise of MCFLPA+00 clock signal. The mantissa is available from the shifter 42 output approximately 145 nanoseconds after the rise of the MCFLPA+00 clock signal.

The mantissa output signals REGR00−63−00 and the exponent and mantissa sign signals REGE56−63+00 are available approximately 10 nanoseconds after the fall of the MCFLPC+00 clock signal and are written into RAMAM 30, RAMBM 32, RAMAE 34, and RAMBE 36, approximately 40 nanoseconds after the rise of the MCFLPF+00 clock signal. The valid write address of RAMAM 30 and RAMBM 32 is available approximately 20 nanoseconds after the rise of the MCFLPF+00 clock signal.

Although the addressing logic for the exponents and mantissas are both timed to the MCFLPA+00 clock signal, the logic is such that the exponents are read out and compared before the mantissa address selection logic is established. This assures that the ADD operation will be completed in one cycle.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same results and fall within the spirit of the claimed invention. It is the intention, therefore, to limit the invention only as indicated by the scope of the claims.

What is claimed is:

1. A processor comprising:

a first and a second random access memory, each storing mantissas of a first and a second operand for performing a scientific ADD instruction;

a third and a fourth random access memory, each storing exponents of said first and said second operands for performing said scientific ADD instruction;

a first arithmetic logic unit coupled to said third and fourth random access memories for receiving said exponent of said first operand from said third random accesss memory, and said exponent of said second operand from said fourth random access memory, and generating a first signal in a first state if said exponent of said first operand is smaller than said exponent of said second operand, and generating said first signal in a second state, if said exponent of said first operand is equal to or larger than said exponent of said second operand, said first arithmetic unit further generating a first plurality of shifter signals indicating the difference in value between the exponents of said first and second operands;

a second arithmetic logic unit coupled to said third and fourth random access memories for receiving said exponent of said first operand from said third random access memory, and said exponent of said second operand from said fourth random access memory, and generating a second signal in a first state if said exponent of said first operand is equal to or larger than said exponent of said second operand, and generating said second signal in a second state, if said exponent of said first operand is smaller than said exponent of said second operand, said second arithmetic unit further generating a second plurality of shift signals indicating the difference in value between the exponents of said first and second operands;

first multiplexing means coupled to said first and second arithmetic logic units and responsive to said second signal in said first state for selecting said first plurality of signals, and responsive to said second signal in said second state for selecting said second plurality of signals;

address selection means coupled to said first, second, third and fourth random access memories for reading out said exponent of said first operand from said third random access memory and said exponent of said second operand from said fourth random access memory, said address selection means being responsive to said first signal in said first state for reading out said mantissa of said first operand from said second random access memory and said mantissa of said second operand from said first random access memory, and responsive to said first signal in said second state for reading out said mantissa of said first operand from said first random access memory and reading out said mantissa of said second operand from said second random access memory;

shifting means coupled to said second random access memory and to said multiplexer means for receiving said mantissa of said first operand to be shifted an amount indicated by said first plurality of shift signals when said exponent of said first operand is smaller than said exponent of said second operand, and receiving said mantissa of said second operand to be shifted an amount indicated by said second plurality of shift signals when said exponent of said second operand is smaller than said exponent of said first operand; and a third arithmetic logic unit coupled to said shifter means and said first random access memory, for receiving said mantissa of said first operand from said first random access memory, and said mantissa of said second operand shifted by an amount indicated by said second plurality of shift signals, or receiving said mantissa of said second operand from said first random access memory, and said mantissa of said first operand shifted by an amount indicated by said first plurality of shift signals, for generating a result.

2. The processor of claim 1 wherein said address selection means comprises:

exponent addressing means coupled to said third and said fourth random access memories for reading out said exponents of said first and second operands;

mantissa addressing means coupled to said first and second random access memories for reading out said mantissas of said first and second operands;

timing means coupled to said exponent addressing means and said mantissa addressing means for initiating the reading out of said mantissas and said exponents wherein said mantissas are read out a predetermined amount of time after said exponents are read out.

3. The processor of claim 2 wherein said address selection means further comprises:

task register means for generating a plurality of task signals for assigning said mantissa of said first operand to a first address location and assigning said mantissas of said second operand to a second address location in both said first and said second random access memories, and assigning said exponent of said first operand to said first address location and assigning said exponent of said second operand to said second address location in both said third and said fourth random access memories; and control means for generating a plurality of control signals for storing said first operand in said first address location and said second operand in said second address location, or said first operand in said second address location and said second operand in said first address location of said first, said second, said third and said fourth random access memories.

4. The processor of claim 3 wherein said mantissa addressing means comprises:

mantissa selection means coupled to said task register means and said control means and responsive to said plurality of task signals and said plurality of control signals for generating a first plurality of mantissa selection signals for addressing said first random access memory and generating a second plurality of mantissa selection signals for addressing said second random access memory; and swapping means responsive to a swap signal in a first state for addressing said first random access memory by said second plurality of mantissa selection signals and addressing said second random access memory by said first plurality of mantissa selection signals, and responsive to said swap signal in a second state for addressing said first random access memory by said first plurality of mantissa selection signals and addressing said second random access memory by said second plurality of mantissa selection signals for reading out said mantissa of said first operand and said mantissa of said second operand.

5. The processor of claim 4 wherein said timing means comprises:

a plurality of clocking signals for initiating the reading out of said mantissas from said first and said second random access memories and said exponents from said third and said fourth random access memories wherein said predetermined amount of time is generated by logic circuit delays.

6. The processor of claim 5 wherein said exponent addressing means comprises:

exponent selection means coupled to said task register means and said control means and responsive to said plurality of task signals and said plurality of control signals for generating a first plurality of exponent selection signals for addressing said third random access memory, and generating a second plurality of exponent selection signals for addressing said fourth random access memory, for reading out said exponent of said first operand and said exponent of said second operand.

7. A processor for performing scientific arithmetic comprising:

random access memory means including a first and a second random access memory, each storing a first and a second mantissa;

a third and a fourth random access memory, each storing a first and a second exponent;

first arithmetic logic unit means coupled to said random access memory means for indicating a smaller of said first and second exponents and the difference between said first and said second exponents;

address selection means coupled to said first arithmetic logic unit means and said random access memory means for selecting said first mantissa if said first exponent is smaller than said second exponent and selecting said second mantissa if said second exponent is smaller than said first exponent;

shifting means coupled to said arithmetic logic unit and to said random access memory for receiving and shifting said first or said second mantissa corresponding to the smaller of said first or said second exponents by said amount that said first and said second exponents differ;

second arithmetic logic means coupled to said random access memory means and to said shifting means for receiving said first or said second mantissa corresponding to a larger of said first or said second exponents from said random access memory or for receiving said first mantissa from said random access memory if said first and said second exponents are equal, and receiving said first or said second mantissa having said smaller of said first or said second exponents shifted by said amount that said first and said second exponents differ, from said shifting means, or receiving said second mantissa from said shifting means if said first exponent equals said second exponent, said second arithmetic logic means receiving said first and said second mantissas and performing said scientific ADD instruction in one processor cycle.

8. The processor of claim 7 where said first arithmetic logic means comprises:

a first adder coupled to said third and said fourth random access memories and generating a first signal in a first state if said first exponent is smaller than said second exponent, and generating a first plurality of shift signals indicating the difference in value between said first and said second exponents.

9. The processor of claim 8 wherein said first arithmetic logic means further comprises:

a second adder coupled to said third and said fourth random access memories and generating a second signal in a first state if said second exponent is smaller than said first exponent, and generating a second plurality of shift signals indicating the difference in value between said first and said second exponents, said first plurality of shift signals being the complement of said second plurality of shift signals.

10. The processor of claim 9 wherein said address selection means comprises:

exponent addressing means coupled to said third and said fourth random access memories for reading out said first and said second exponents;

mantissa addressing means coupled to said first and said second random access memories for reading out said first and said second mantissas;

timing means coupled to said exponent addressing means and said mantissa addressing means for initiating the readout of said first and said second exponents and after a predetermined amount of time, reading out said first and said second mantissas.

11. The processor of claim 10 wherein said address selection means further comprises:

task register means for generating a plurality of task signals for defining a first address location and a second address location in said first, said second, said third and said fourth random access memories;

control means for generating a plurality of control signals for storing said first operand in said first address location and said second operand in said second address location, or said first operand in said second address location and said second operand in said first address location of said first, said second, said third and said fourth random access memories.

12. The processor of claim 11 wherein said mantissa addressing means comprises:

mantissa selection means coupled to said task register means and said control means and responsive to said plurality of task signals and said plurality of control signals for generating a first plurality of mantissa selection signals for addressing said first random access memory and generating a second plurality of mantissa selection signals for addressing said second random access memory; and swapping means responsive to a swap signal in a first state for addressing said first random access memory by said second plurality of mantissa selection signals and addressing said second random access memory by said first plurality of mantissa selection signals, and responsive to said swap signal in a second state for addressing said first random access memory by said first plurality of mantissa selection signals and addressing said second random access memory by said second plurality of mantissa selection signals, for reading out said mantissa of said first operand and said mantissa of said second operand.

13. The processor of claim 12 wherein said timing means comprises:

a plurality of clocking signals for initiating the reading out of said mantissas from said first and said second random access memories and said exponents from said third and said fourth random access memories wherein said predetermined amount of time is generated by logic circuit delays.

14. The processor of claim 13 wherein said exponent addressing means comprises:

exponent selection means coupled to said task register means and said control means and responsive to said plurality of task signals and said plurality of control signals for generating a first plurality of exponent selection signals for addressing said third random access memory, and generating a second plurality of exponent selection signals for addressing said fourth random access memory, for reading out said exponent of said first operand and said exponent of said second operand.

* * * * *